United States Patent [19]

Dalton

[11] Patent Number: 5,108,499
[45] Date of Patent: Apr. 28, 1992

[54] CORROSION INHIBITOR FOR USE IN COATING FORMULATIONS COMPRISING SYNERGISTIC COMBINATIONS OF A CALCIUM BORATE AND ZINC BIS[3-N,N-DIPROPYLAMINE]PROPIONATE

[75] Inventor: Dennis L. Dalton, Cordova, Tenn.

[73] Assignee: Buckman Laboratories International, Inc., Memphis, Tenn.

[21] Appl. No.: 603,383

[22] Filed: Oct. 26, 1990

[51] Int. Cl.⁵ .............................................. C04B 9/02
[52] U.S. Cl. ................................................. 106/14.44
[58] Field of Search ..................................... 106/14.44

[56] References Cited

U.S. PATENT DOCUMENTS

| | | | |
|---|---|---|---|
| 3,699,052 | 10/1972 | Petrey | 106/14.13 |
| 4,192,769 | 3/1980 | Jahnke | 106/14.18 |
| 4,212,674 | 7/1980 | Strauch | 106/14.44 |
| 4,297,236 | 10/1981 | Diery et al. | 106/14.18 |

OTHER PUBLICATIONS

Material Safety Data Sheet, Butrol 9101, Jun. 27, 1991.
Material Safety Data Sheet, COTROL 18-8, Oct. 20, 1989.

Primary Examiner—William R. Dixon, Jr.
Assistant Examiner—Margaret V. Einsmann
Attorney, Agent, or Firm—Finnegan, Henderson, Farabow, Garrett & Dunner

[57] ABSTRACT

A synergistic combination of a calcium borate and a zinc bis[3-N,N-dipropylamine]propionate for use as a corrosion inhibitor in coating formulations. Preferably, the corrosion inhibitor is a powder formed by treating a calcium borate with a zinc bis[3-N,N-dipropylamine]-propionate.

12 Claims, No Drawings

CORROSION INHIBITOR FOR USE IN COATING FORMULATIONS COMPRISING SYNERGISTIC COMBINATIONS OF A CALCIUM BORATE AND ZINC BIS[3-N,N-DIPROPYLAMINE]PROPIONATE

BACKGROUND OF THE INVENTION

The present invention relates to a corrosion inhibitor for use in coating formulations such as primers, intermediate coats or topcoats. The corrosion inhibitor comprises synergistic combinations of a calcium borate and an amino carboxylate, zinc bis[3-N,N-dipropylamine]propionate.

As is known in the art, corrosion inhibitors are incorporated into coating formulations to provide or enhance protection of underlying metal surfaces against oxidation and electrochemical corrosion. Known corrosion inhibitors include zinc chromate, strontium chromate, barium metaborate, calcium borate, zinc phosphate, calcium boro-silicate and zinc phospho oxide. These known inhibitors are all powdered pigments which are incorporated into coating formulations under high-shear agitation during the pigment grinding stage along with other common pigments such as titanium dioxide, calcium carbonate, clay, mica and barium sulfate.

Calcium borates are known corrosion inhibitors. Corrosion inhibiting coating compositions containing calcium metaborate are described in U.S. Pat. No. 3,380,836; the disclosure of which is incorporated herein by reference. However, when calcium borates are used by themselves in coating compositions they can cause the coating to be susceptible to blistering after being applied to a metal surface and being exposed to a corrosive environment. See Example.

The use as a liquid corrosion inhibitor of amino carboxylate which is zinc bis[3-N,N-dipropylamine]propionate, manufactured by CasChem, Inc. as COTROL 18-8 product has recently been reported in the trade literature. Unlike traditional corrosion inhibitors which are in pigment or powder form, the zinc bis[3-N,N-dipropylamine]propionate, being a liquid, is not incorporated by itself into coating formulations during the pigment grinding stage, but rather during the subsequent let-down stage along with other liquid components, i.e., resin emulsions, dispersants, etc. When the zinc bis[3-N,N-dipropylamine]propionate is used by itself to inhibit corrosion in a coating formulation, the coating formulation can be susceptible to softening of the final coating and loss of adhesion to the metal surface. Thus a coating formulation containing zinc bis[3-N,N-dipropylamine]propionate might be scraped off the metal surface to which it is applied, leaving the surface unprotected.

SUMMARY OF THE INVENTION

It is an object of the present invention to provide a corrosion inhibitor which can give increased corrosion resistance to a coating formulation and can reduce the susceptibility of the coating to blistering, softening and loss of adhesion. It is a further object of the present invention to provide a corrosion inhibitor capable of having the above properties and which can be in a form easily and routinely handled, such as a pigment or powder. Additionally, it is an object of the present invention to provide (1) a coating formulation containing such a corrosion inhibitor, (2) a method of preventing or reducing corrosion of a surface susceptible to corrosion, such as a metal surface, comprising use of the corrosion inhibitor, and (3) a surface coated with a composition containing the corrosion inhibitor.

The above objects can be accomplished with a corrosion inhibitor comprising a synergistically effective amount of a calcium borate and zinc bis[3-N,N-dipropylamine]propionate. Corrosion of a metal surface can be prevented or reduced by coating the metal surface with a coating formulation containing a corrosion-reducing amount of the corrosion inhibitor.

DESCRIPTION OF THE INVENTION

The corrosion inhibitor of the present invention comprises a synergistic combination of calcium borate and an zinc bis[3-N,N-dipropylamine]propionate. The synergistic combination can be achieved in at least two ways: 1) adding to a coating formulation the calcium borate and a zinc bis[3-N,N-dipropylamine]propionate separately in synergistically effective amounts and 2) treating the calcium borate with a zinc bis[3-N,N-dipropylamine]propionate to form a treated calcium borate pigment or powder, the calcium borate and the zinc bis[3-N,N-dipropylamine]propionate being present in synergistically effective amounts.

The calcium borate suitable for use may be of any available form such as, but not limited to, calcium borate, calcium orthoborate, calcium metaborate, calcium pyroborate, calcium sesquiborate or hydrates thereof. The preferred calcium borate is calcium metaborate or a hydrate thereof. Calcium metaborate is available from American Borate Company of Virginia Beach, Va. and is sold as TURKISH COLEMANITE product.

The zinc bis[3-N,N-dipropylamine]propionate preferably employed in the invention is the COTROL 18-8 product, described above, which is manufactured by CasChem, Inc., or BUTROL 9101 product of Buckman Laboratories, Inc. This liquid zinc bis[3-N,N-dipropylamine]propionate was tested in coatings in conjunction with traditional calcium borate corrosion inhibitors to determine optimum use levels with lowest cost. Surprisingly, it was discovered that the use of zinc bis[3-N,N-dipropylamine]propionate in the presence of calcium borate can yield increased corrosion protection that is superior to that of either corrosion inhibitor used by itself and can also provide other performance benefits.

A first embodiment of this invention is achieved by adding a calcium borate and zinc bis[3-N,N-dipropylamine]propionate separately to a coating formulation but in a total amount which is synergistically effective to prevent or at least reduce corrosion of the metal surface to be coated. The calcium borate is added during the pigment grinding stage; the zinc bis[3-N,N-dipropylamine]propionate is added during the let-down stage when other liquids are added.

A second and preferred embodiment involves physically combining a calcium borate and an zinc bis[3-N,N-dipropylamine]propionate into one product prior to addition to a coating formulation. This embodiment advantageously allows both inhibitors to be added to coating formulations as a single corrosion inhibitor in a pigment or powder form. The single corrosion inhibitor can have the properties of normal dry pigmented products and can be handled and processed like traditional corrosion inhibiting pigments.

The corrosion inhibitor of this second embodiment is advantageously added to a coating formulation in the pigment grinding stage as is routinely done in the art. This corrosion inhibitor can be prepared using conventional liquid/powder mixing techniques such as spray/tumble mixing, spray-drying, or other conventional techniques.

The corrosion inhibitors according to both embodiments of the invention comprise synergistically effective amounts of a calcium borate and an zinc bis[3-N,N-dipropylamine]propionate for reduction or prevention of surface corrosion. Preferably these components are combined in a ratio ranging from about 99:1 to about 75:25. In both embodiments, and particularly the second embodiment above, the components are combined in a more preferred ratio ranging from about 99:1 to about 80:20. The most preferred ratio of the calcium borate to zinc bis[3-N,N-dipropylamine]propionate is 90:10 for both embodiments.

Depending on the intended use of the surface to be coated, the corrosion inhibitor of the invention may be added to a coating formulation in an amount preferably ranging from about 0.5 to about 50 percent by weight of the coating formulation. Increased amounts of the corrosion inhibitor in the coating formulation are highly preferred where the surface to be coated will be used in an environment conducive to corrosion.

The corrosion inhibitor of the present invention can be used in conventional latex-based and oil-based coating formulations such as primers or other types of paints.

The following example is intended to illustrate, not limit, the present invention.

EXAMPLE

A white long-oil alkyd primer coating formulation was prepared according to the formulation set forth in Table 1. This formulation was divided into three parts and to each was added 5.0 percent by weight of a corrosion inhibitor. Coating formulation 1 contained calcium metaborate, TURKISH COLEMANITE product, as the sole corrosion inhibitor. The zinc bis[3-N,N-dipropylamine]propionate, COTROL 18-8 product, was incorporated as the sole corrosion inhibitor in coating formulation 2. In formulation 2, the zinc bis[3-N,N-dipropylamine]propionate was added in the second step along with the other liquids. Coating formulation 3 contained a corrosion inhibitor comprising a synergistically effective amount of calcium metaborate, the TURKISH COLEMANITE product, and the zinc bis[3-N,N-dipropylamine]propionate, COTROL 18-8 product, according to the first embodiment of the invention. Each of the coating formulations was applied as self-primed white long-oil alkyd primers onto cold-rolled steel Q-panels.

TABLE 1

| White Long-Oil Alkyd Primer Formulation | | |
|---|---|---|
| | lbs./100 Gal. | % By weight |
| Beckosol P-470-70 (10-060) Alkyd Resin | 214.0 | 18.8 |
| Mineral Spirits Solvent | 50.0 | 4.4 |
| Soya Lecithin Dispersant | 3.0 | 0.3 |
| Bentone 38 Gel Thickener | 25.0 | 2.2 |
| Corrosion Inhibitor | 57.0 | 5.0 |
| Ti-Pure R-900 Titanium Dioxide | 250.0 | 22.0 |
| Nytal 300 Talc | 220.0 | 19.3 |
| Grind on High Speed Mill, then add the following: | | |
| Beckosol P-470-70 (10-060) Alkyd Resin | 214.0 | 18.8 |
| 6% Zirco Drier | 6.0 | 0.5 |
| 6% Cobalt Naphthalene Drier | 1.0 | 0.1 |

TABLE 1-continued

| White Long-Oil Alkyd Primer Formulation | | |
|---|---|---|
| | lbs./100 Gal. | % By weight |
| ASA Antiskimming Agent | 2.0 | 0.2 |
| Mineral Spirits Solvent | 102.0 | 8.4 |
| | 1144.0 | 100.0 |

Table 2 shows the corrosion resistance of coating formulations after 425 hours of salt-spray exposure according to ASTM B117. The ratings were made according to ASTM D 610 with 10 being no corrosion and 0 being corrosion over the entire coating surface.

TABLE 2

| Coating No. | Inhibitor | Corrosion Rating |
|---|---|---|
| 1 | 5% Calcium borate | 7 |
| 2 | 5% zinc bis[3-N,N-dipropylamine]-propionate | 7 |
| 3 | 4.5% Calcium borate 0.5% zinc bis[3-N,N-dipropylamine]-propionate | 9 |

Table 3 shows the blister resistance of the coating formulations after 425 hours of salt spray exposure according to ASTM B117. Ratings were made according to ASTM D714 with 10 being no blisters and 0 being large blisters; F=few, M=medium, MD=medium dense, D=dense.

TABLE 3

| Coating No. | Inhibitor | Blister Resistance Rating(s) |
|---|---|---|
| 1 | 5% Calcium borate | 4 M |
| 2 | 5% zinc bis[3-N,N-dipropylamine]-propionate | 7 MD |
| 3 | 4.5% Calcium borate 0.5% zinc bis[3-N, N-dipropylamine]propionate | 10 |

Table 4 shows the coating integrity of the coating formulations after 425 hours of salt-spray exposure according to ASTM B117.

TABLE 4

| Coating No. | Inhibitor | Coating Integrity |
|---|---|---|
| 1 | 5% calcium borate | Hard Film/ Good Adhesion |
| 2 | 5% zinc bis[3-N,N-dipropylamine]-propionate | Softer film can be scratched from panel |
| 3 | 4.5% calcium borate 0.5% zinc bis[3-N,N-dipropylamine]-propionate | Hard film/ Good adhesion |

As seen from the above results, the coating containing the corrosion inhibitor of the present invention provided better corrosion protection to the steel panels than either of the coatings containing the calcium metaborate or the zinc bis[3-N,N-dipropylamine]propionate corrosion inhibitors separately. The synergistic corrosion inhibitor of this invention not only yielded superior corrosion protection but also provided other improvements over either of the single inhibitors: (1) the synergistic combination of inhibitors did not cause blistering of the coating when exposed to a corrosive salt-fog environment, whereas calcium borate when used by itself does demonstrate the disadvantage of causing blister formation; and (2) the synergistic combination did not cause film softening or a reduction in adhesion of the coating's film to the metal surface after exposure to salt-fog, whereas the zinc bis[3-N,N-dipropylamine]propionate by itself did show some softening and reduction in adhesion.

What is claimed is:

1. A corrosion inhibitor comprising a corrosion-reducing amount of a calcium borate and an zinc bis[3-N,N-dipropylamine]propionate, wherein the ratio of said calcium borate to zinc bis[3-N,N-dipropylamine]propionate is from about 99:1 to about 75:25.

2. The corrosion inhibitor of claim 1, wherein said ratio is from 99:1 to 80:20.

3. The corrosion inhibitor of claim 2, wherein said ratio is about 90:10.

4. A method of reducing the corrosion of metal surfaces comprising coating said surface with a corrosion-reducing amount of the corrosion inhibitor of claim 1.

5. The method of claim 4, wherein said corrosion inhibitor is present in a corrosion-preventing amount.

6. A coating formulation comprising the corrosion inhibitor of claim 1.

7. The coating formulation of claim 6, wherein the corrosion inhibitor is added to said coating formulation in the amount of about 0.5 to about 50 percent by weight of said coating formulation.

8. The coating formulation of claim 7, wherein the ratio of calcium borate to the zinc bis[3-N,N-dipropylamine]propionate is from about 99:1 to about 75:25.

9. The coating formulation of claim 8, wherein the ratio of calcium borate to zinc bis[3-N,N-dipropylamine]propionate is about 90:10.

10. The coating formulation of claim 9, wherein said coating formulation is a paint.

11. The coating formulation of claim 9, wherein said calcium borate is calcium metaborate.

12. A surface coated with the corrosion inhibitor of claim 1.

* * * * *

UNITED STATES PATENT AND TRADEMARK OFFICE
CERTIFICATE OF CORRECTION

PATENT NO. : 5,108,499
DATED : April 28, 1992
INVENTOR(S) : Dennis L. Dalton It is certified that error appears in the above-identified patent and that said Letters Patent is hereby corrected as shown below:

Claim 1,    column 5, line 8, delete "an".

Claim 8,    column 6, line 8, delete "the".

Signed and Sealed this

Seventeenth Day of August, 1993

*Attest:*

BRUCE LEHMAN

*Attesting Officer*     Commissioner of Patents and Trademarks